Figure 1:
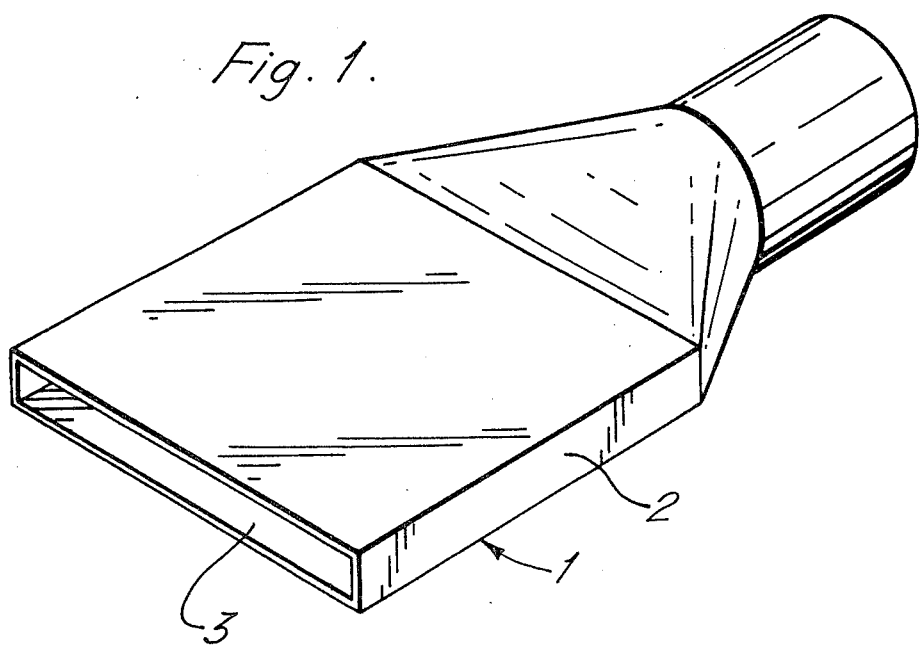

United States Patent [19]
Hawkins

[11] 3,934,050
[45] Jan. 20, 1976

[54] PROCESS FOR THE MANUFACTURE OF A COOKED FIBROUS RESTRUCTURED MEAT PRODUCT

[75] Inventor: Arthur Ernest Hawkins, Bedford, England

[73] Assignee: Lever Brothers Company, New York, N.Y.

[22] Filed: Feb. 20, 1975

[21] Appl. No.: 551,801

Related U.S. Application Data

[63] Continuation of Ser. No. 495,955, Aug. 9, 1974, abandoned.

[52] U.S. Cl. ............... 426/645; 426/513; 426/516; 426/646
[51] Int. Cl.² ......................................... A22C 18/00
[58] Field of Search ............ 426/92, 315, 412, 420, 426/513, 523, 516, 517, 645, 646

[56] References Cited
UNITED STATES PATENTS

| | | | |
|---|---|---|---|
| 2,423,964 | 7/1947 | Coffman | 426/315 |
| 3,482,998 | 12/1969 | Carroll et al. | 426/646 |
| 3,495,992 | 2/1970 | De For | 426/412 |
| 3,664,849 | 5/1972 | Autry | 426/92 |

FOREIGN PATENTS OR APPLICATIONS

| 592,590 | 9/1947 | United Kingdom | 426/92 |
|---|---|---|---|

Primary Examiner—Hyman Lord
Attorney, Agent, or Firm—James J. Farrell, Esq.

[57] ABSTRACT

Meat comminute is converted into a cooked restructured meat having a surface that is grained, resembling that of slices cut in the direction of the muscle fibres from cooked meat of good quality.

2 Claims, 4 Drawing Figures

PROCESS FOR THE MANUFACTURE OF A COOKED FIBROUS RESTRUCTURED MEAT PRODUCT

This invention relates to restructured meat products.

Much of the musculature of a meat carcase is, though nutritionally good, associated with so much tough connective tissue that it makes poor eating. If the natural structure producing this unsatisfactory eating texture is destroyed by finely comminuting the meat with conventional equipment such as a colloid mill, hammer mill or bowl chopper, the comminute can be restructured into meat-like products. However, although such restructured products are on cooking more palatable and tender than the original meat is when cooked, their appearance does not much resemble that of cooked natural meat of good quality.

The present invention is concerned with manufacturing from meat comminute a cooked meat product with a surface that is grained, resembling that of slices cut in the direction of the muscle fibres from cooked meat of good quality.

In the process of the invention, a meat comminute is extruded through a slit; and the flat comminute-extrudate thus obtained is cooked between and in intimate contact with layers of absorber heat-stable paper, at least one of the layers having a grained surface which is in contact with the extrudate, so that when the layers are separated from the cooked product, the product is left with an exposed grained surface.

A chewy texture resembling that of good quality cooked meat can be obtained in the final cooked product by carrying out extrusion under conditions which ensure that the extrudate is compact and well knit, with its fibres generally aligned in the direction of extrusion. Preferably, the fibre content of the comminute is at least in part constituted by the fibre of cooked meat or spun protein fibre e.g. of soy protein, which is suitably included in an amount forming from 5 to 20% by weight of the comminute submitted to extrusion. Preferably, extrusion is carried out through a slit of depth 1.5 – 11 mm, particularly 3 – 7 mm, the first depth corresponding to a very thin slice of meat, that of 11 mm corresponding to a steak of moderate thickness, and the range 3 – 7 mm running from slices of ordinary thickness to 'minute steak'. The width of the slit may vary considerably, to correspond with the type of end product desired; thus, if slices of roast beef are to be simulated, a slit width of 7 – 12 cm is suitable; whereas, if pieces of cooked lamb, duck, chicken, or beef are required say for pies, a slit only 1 or 2 cm wide can be used, the strip extruded from it being (preferably after cooking) cut up into suitably sized pieces.

Suitable conditions for extrusion are obtained by feeding comminute to the extrusion slit by way of a flat elongated channel the dimensions of whose cross-section correspond generally with those of the slit. The length chosen for the channel depends to some extent on the dimensions of the slit; for a slit width of 7 cm for example, the length of the channel is suitably 15 cm. Of course, the longer the channel, the higher will be the pressure required to extrude the comminute. In order to minimize irregularities of flow ('slip=stick') that result from the tendency of the comminute to adhere to the walls of the channel, extrusion is preferably carried out by a piston exerting constant pressure, rather than by one which sweeps out constant volume in unit time.

The flat comminute-extrudate obtained by such means as just described is cooked between and in intimate contact with layers of absorbent heat-stable paper, at least one of the layers having a grained surface which is in contact with the extrudate.

The absorbent heat-stable paper, which is preferably a creped paper towelling, holds the cooking liquors released from the meat extrudate during the cooking process, keeping them in close contact with the meat and so preventing the meat surfaces from drying out and hardening through extensive loss of moisture to the atmosphere in which cooking is carried out. Cutting down moistureloss in turn avoids undue shrinkage and darkening of the meat and the development of a smooth surface, reminiscent of cooked liver. Additionally, because of the intimate contact between them during cooking, that layer of absorbent paper which has a grained surface develops a grain on that surface of the extrudate with which it is in contact. Accordingly, when the layers of absorbent paper are separated from the cooked product, the latter is left with an exposed surface having a grained appearance resembling that of slices of meat cut along the grain in the direction of the muscle fibres. Of course, both layers of absorbent material between which the extrudate is cooked may — and it is convenient to ensure that they *do* — have a grained surface. In performing the invention, however, it is sufficient that only one of them has; for in that case, when the product is in due course served up, it is easy enough to ensure that it is served with the grained surface uppermost.

As already indicated, creped paper tissue is the material that is preferably used in the process of the invention; its physical and chemical integrity at cooking temperatures is good, and its surface requires no treatment to impose a grain, having of itself a grained structure which the 'contact surface' of the meat readily takes up during cooking. If the tendency of the paper to shrink is reduced by a pre-treatment in which it is first wetted and then dried before use, the grain which the 'contact surface' of the meat takes up is less pronounced, and this may sometimes be desired.

The means employed for cooking will to some extent depend on the kind of end product desired, but, should ensure that a temperature of at least 65°C is attached in the interior of the meat. If cooking is carried out by exposure to hot oven gases (whether dry or of controlled humidity), the oven temperature used is preferably in the range 150° – 200°C.

The time of exposure to the cooking atmosphere will then vary with the total thickness of the comminute-extrudate employed; thus, while 5 minutes is suitable for a single slice, some 30 minutes or more may be required for 10 slices (interleaved of course with layers of absorbent heat-stable paper) piled one on top of another. If microwave cooking is employed (e.g. at 2450 Mils frequency), cooking may take as little as 1 minute; with microwave cooking, the grain developed tends to be less pronounced.

In one particular way of performing the invention, meat comminute is extruded continuously onto a band of absorbent heat-stable paper which is continuously unwound from a roll onto a moving endless conveyor belt arranged to pass through a tunnel oven. A second band of absorbent heat-stable paper is continuously unwound from a roll onto the comminute. One or both of the layers of absorbent heat-stable paper have a grained surface, and this surface is brought into contact with the extrudate. Supported by the conveyor belt the comminute passes through the oven, from which it emerges cooked. The layers of absorbent material are then stripped from it by knives, leaving the cooked extruded material with at least one grained surface; and the separated layers of absorbent paper are wound up on rolls. The cooked product may then be stored in chill until required for sale or use, say in the preparation of packaged or canned meals.

The accompanying drawings illustrate certain aspects of the invention.

Figure 2:
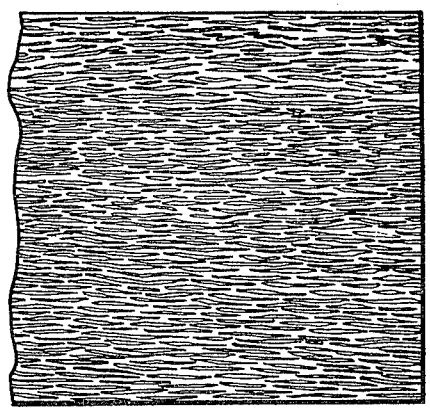
Figure 3:
Figure 4:

FIG. 1 shows a form of extrusion nozzle 1 for meat comminute, having an elongated channel 2 through which comminute is fed to a slit 3;

FIG. 2 illustrates on an enlarged scale the surface structure of a fragment of a form of paper tissue suitable for use in carrying out the invention;

FIGS. 3 and 4 respectively show: cooked comminute-extrudate obtained by the procedure of Example 1 that follows later; and cooked comminute-extrudate obtained following generally the procedure of Example 1, but without the use of absorbent heat-stable material during cooking.

The invention is further illustrated by the following Examples.

EXAMPLE 1

Frozen boneless forequarter of beef was passed through a mincer plate having holes of diameter 3 mm, and the issuing comminute (temperature not above 10°C) was mixed with sodium chloride (1% by weight), monosodium glutamate (0.34%), cooked meat fibre (7.5%) and water (10%).

The meat fibre ingredient had been obtained by cooking cubes (of 4 cm side) of boneless topside of beef at 120°C for 1 hour, and teasing the cooked material for 15 seconds in a bowl chopper with its blade/wall gap set at 4 mm.

The comminute was extruded under a constant pressure of 30 psi (2 kg/cm$^2$) in lengths of 25 cm through an extrusion nozzle as shown in FIG. 1 of the drawings, having an extrusion slit 6.3cm wide and 3mm deep. Each strip of extruded comminute was put between two layers of absorbent paper tissue of the kind whose surface is illustrated in FIG. 2, and was cooled in a dry air oven (temperature 180°C) for 5 minutes. The cooked product, on removal of the enclosing absorbent layers, had the grained appearance shown in FIG. 3, and had an excellent chewing texture. By contrast, paper prepared and cooked identically except that no enclosing absorbent layers were used had the appearance shown in FIG. 4, and had a dry, tough eating texture.

EXAMPLE 2

Following generally the procedure of Example 1, but without the addition of water, deboned frozen chicken was converted to a comminute containing salts (1.54%) and cooked chicken (breast) fibre (7.5%).

The comminute was extruded and cooked as in Example 1. The product, on removal of the absorbent layers, had an appearance similar to that of cooked breast of chicken and had an acceptable chewing texture.

What is claimed is:

1. A process for the manufacture of a cooked fibrous restructured meat product comprising:
    i. extruding a meat comminute in the form of a flat extrudate having the fibers thereof generally aligned in the direction of said extrusion;
    ii. interposing said extrudate, before cooking, between two layers of heat-stable absorbent crepe paper which are capable of holding the liquors released from said extrudate during cooking, at least one of said layers having a grained surface in intimate contact with said extrudate;
    iii. cooking said extrudate to produce a temperature of at least 65°C therein while so interposed between and in intimate contact with said layers whereby said crepe paper layers remain separable from the cooked product and, upon separation therefrom, leave the surface thereof with a grained appearance resembling that of a slice of meat cut in the direction of the muscle fibers; and
    iv. removing said separable layers from said cooked product to form a final cooked product.

2. A process as defined in claim 1 further comprising incorporating about 5 to about 20% by weight of spun protein fiber into said comminute before said extrusion.

* * * * *